June 3, 1958   J. W. TOMKA   2,837,059
VARIABLE STROKE PRESS

Filed April 19, 1956   4 Sheets-Sheet 1

Witness:
Richard W. Carpenter

INVENTOR.
Joseph W. Tomka
BY
Walter L. Schlegel, Jr. Atty.

June 3, 1958 — J. W. TOMKA — 2,837,059
VARIABLE STROKE PRESS
Filed April 19, 1956 — 4 Sheets-Sheet 2

INVENTOR.
Joseph W. Tomka

June 3, 1958 J. W. TOMKA 2,837,059
VARIABLE STROKE PRESS
Filed April 19, 1956 4 Sheets-Sheet 3

INVENTOR.
Joseph W. Tomka
BY
Walter L. Schlegel, Jr.
Atty.

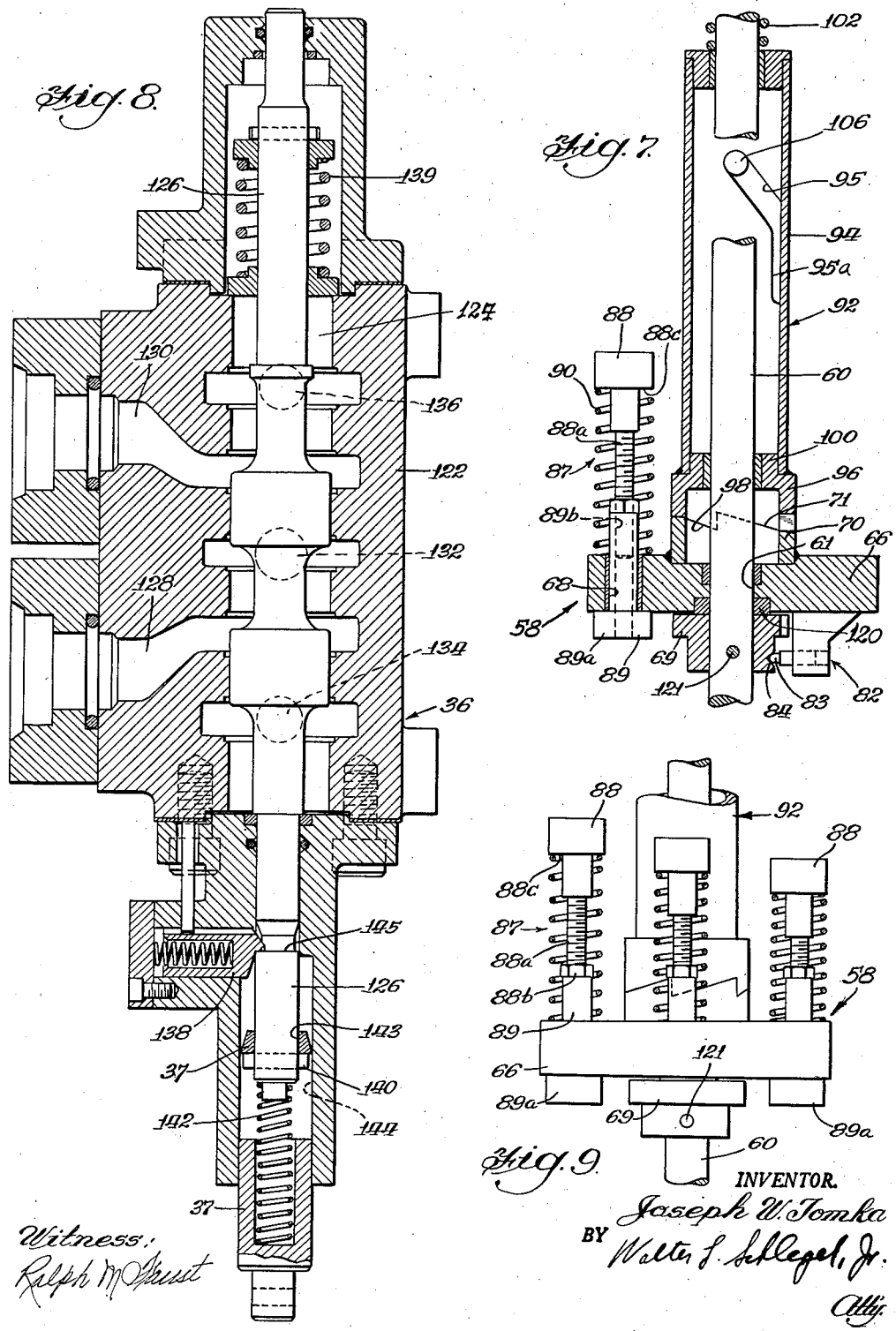

United States Patent Office 2,837,059
Patented June 3, 1958

2,837,059

VARIABLE STROKE PRESS

Joseph W. Tomka, Cincinnati, Ohio, assignor to American Steel Foundries, Chicago, Ill., a corporation of New Jersey Application April 19, 1956, Serial No. 579,322

20 Claims. (Cl. 121—38)

This invention relates to indexing devices and more particularly to an indexing device for automatically regulating the length of the stroke of a movable member in a metal forming machine such as a hydraulic press, and is a continuation-in-part of my co-pending application, Serial No. 499,935, filed April 7, 1955, now abandoned.

In many types of metal forming operations, a prime example of which is a tube bending press, it is necessary that there be a plurality of press strokes of varying lengths in a particular sequence to form a single work piece. Normally this requires the press operator to manually reset the press after each stroke and necessarily increases the cost of the operation.

Although various indexing devices have been devised for presses, none have proved to be entirely satisfactory for one reason or another.

Although a high degree of accuracy is required in a press indexing device, simplicity in design and construction is necessary for efficient and economical use and maintenance of the machine.

Accordingly, it is a primary object of this invention to provide an accurate indexing device of simple construction and operation.

Another object of the invention is the provision of an indexing device particularly adapted to be used in connection with a hydraulic press.

Another object of the invention is to provide an automatic indexing device offering a plurality of adjustable positions.

Another object is the provision of an indexing device that may be easily installed on a conventional hydraulic press.

Still another object of the invention is the provision of an indexing device for varying the stroke of a press platen, the indexing mechanism of the device being responsive to the advance stroke of the press platen.

These and other objects of the invention will become apparent from an examination of the following description and drawings, wherein:

Figure 5 is a fragmentary top plan view of the indexing device;

Figure 6 is a bottom plan view of the turret assembly of the indexing device;

Figure 7 is an auxiliary sectional view through the turret assembly showing more clearly the construction details thereof;

Figure 8 is a longitudinal sectional view through the latch-type four-way control valve, and Figure 9 is a fragmentary side elevational view of the turret assembly illustrating a plurality of the adjustable height plungers.

It will be noted that certain elements have been intentionally omitted from some views where they could be illustrated to better advantage in other views.

Figure 1:
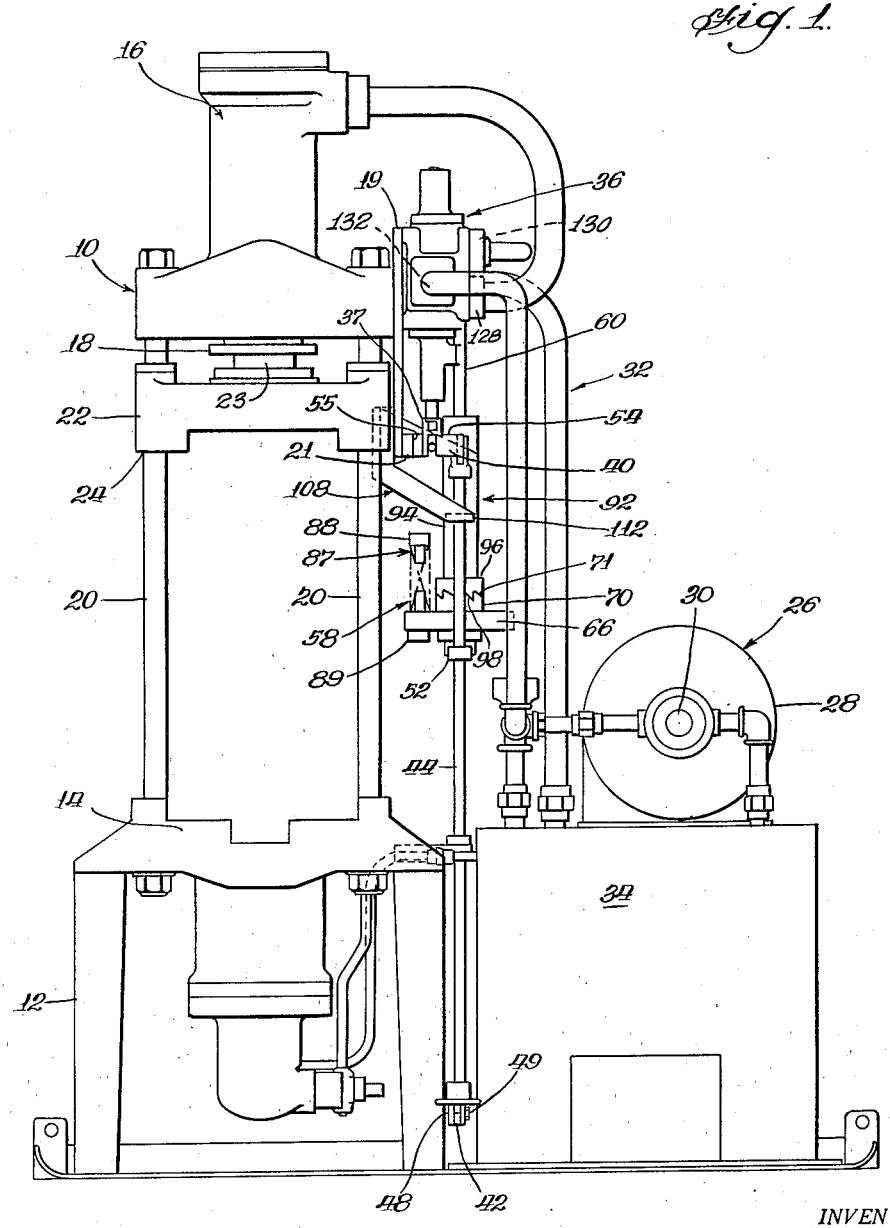
Figure 1 is a front elevational view of a hydraulic press embodying the novel indexing device.
Figure 2:
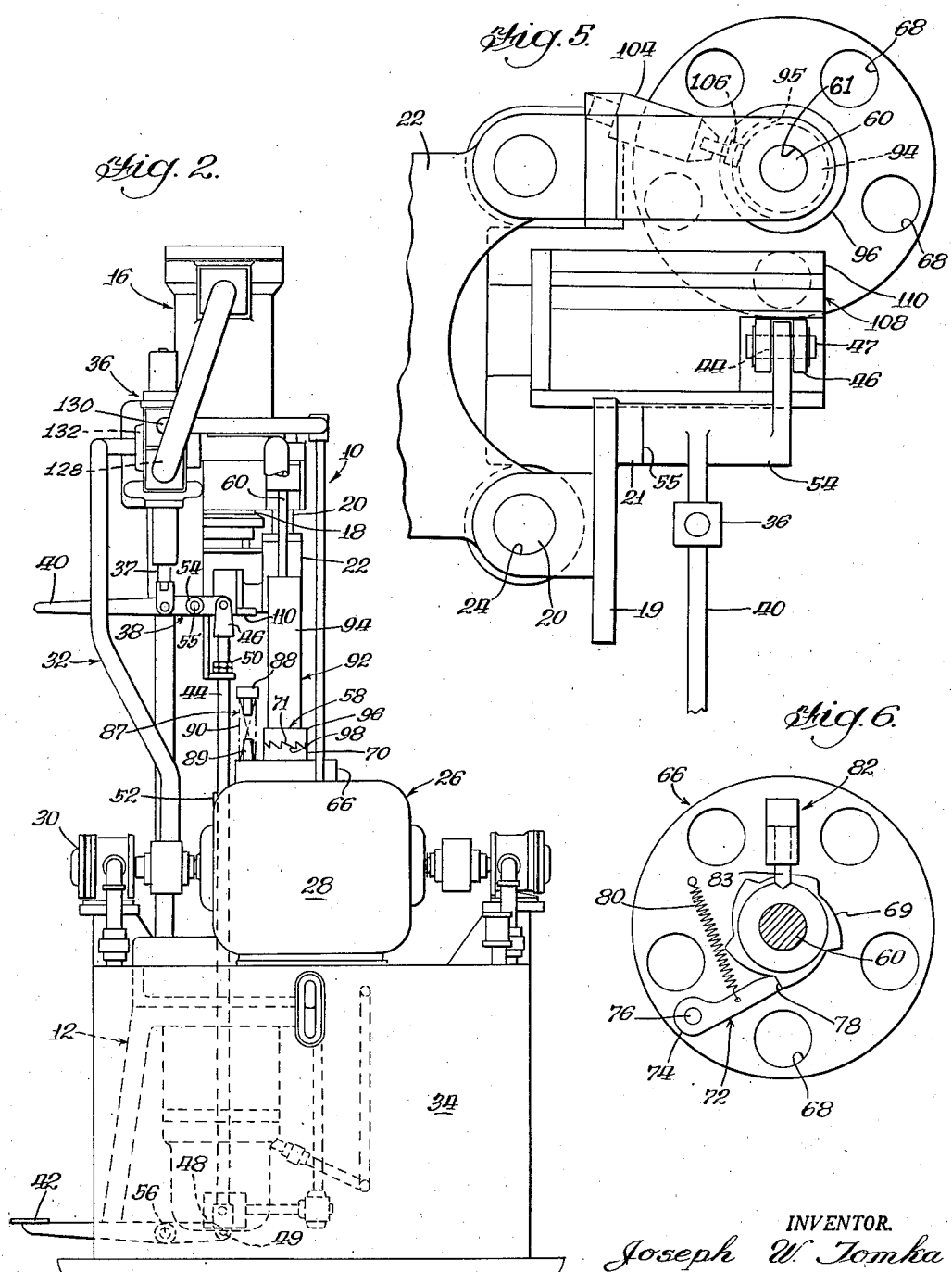
Figure 2 is a side elevational view of the structure illustrated in Figure 1.
Figure 3:
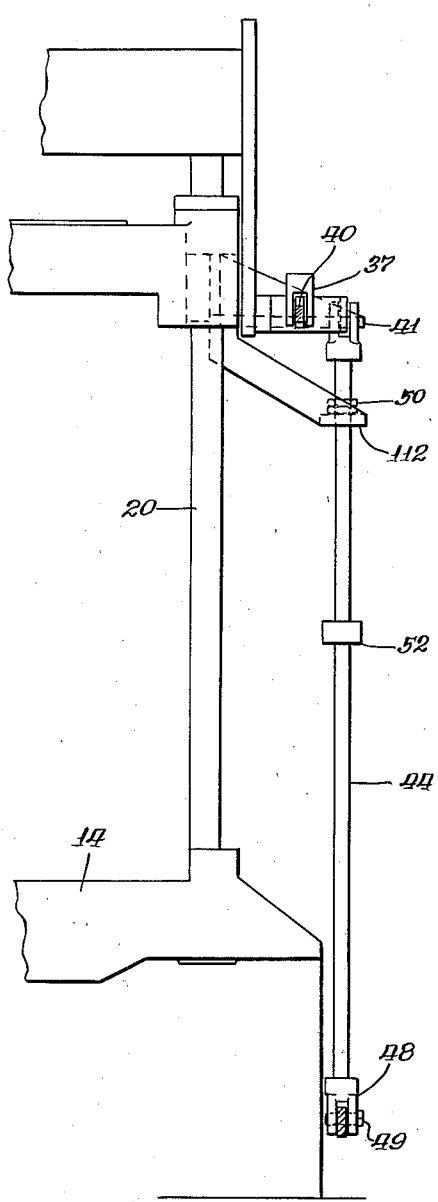
Figure 3 is a fragmentary front elevational view of the indexing device.

Describing the invention in detail and referring to Figures 1 and 2 of the drawings, it will be noted that the press frame, indicated generally at 10, includes a base section 12 having a stationary platen 14 on the lower portion thereof and an upper or cylinder section 16 which houses a hydraulic cylinder 18. A mounting bracket 19, having a fulcrum hub 21, may be rigidly secured to the side of the frame. The cylinder section is supported from the base section section by a plurality of columns 20 spaced from each other.

A movable member or platen 22 is provided with spaced apertures 24 through which are received the respective columns 20 to permit the slidable movement of the platen between the cylinder and base sections of the frame.

The platen 22 is secured to and movable with the ram means 23 which is reciprocal in the cylinder 18.

The hydraulic cylinder 18 is actuated by conventional power means indicated generally at 26 which includes a motor 28, a pump 30, oil lines 32 and a reservoir 34.

A conventional latch-type four-way control valve 36 may be provided for the circuit and positioned on the upper section of the frame.

The control linkage 38 (see also Figure 4) includes an upper hand control lever 40, having an elongated hub section 54, and connected at 41 to valve 36, and a lower foot lever 42. The upper and lower extremities of a vertical control shaft 44 may be pivotally connected to the upper and lower control levers 40 and 42 by means of clevis connections 46 and 48 and pivots 47 and 49, respectively. Additionally, the shaft may be provided with spaced upper and lower stops or abutments 50 and 52, respectively.

The upper lever 40 and the lower lever 42 may be fulcrumed to the frame by means of pivots 55 and 56, respectively.

The press may include additional elements such as controls and gages which are not described in detail as they are not part of this invention.

The indexing device (see also Figures 7 and 9), indicated generally at 58, comprises a nonrotatable vertically disposed shaft 60 secured to the frame 10 at upper and lower connection points 62 and 64 (Figure 4), respectively. A table or turret assembly 66 having a central opening 61 (Figure 7) is rotatably received on the shaft 60. Formed integrally with or welded to the turret is a turret index cam 70 provided with a plurality of cam teeth 71.

The turret is carried by a thrust bearing 120 which in turn is supported by a ratchet wheel 69 pinned as at 121 to the shaft 60. The ratchet assembly, generally indicated at 72, is best seen in Figure 6 and comprises a ratchet wheel 69 having a plurality of teeth 78 which are successively engageable by a pawl 74 which is pivotally mounted on the turret 66 by means of a pivot pin 76. The pawl 74 is constantly urged into position against the ratchet wheel by means of a spring 80. The purpose of the ratchet assembly 72 is to prevent any possible backing up of the turret during any portion of the cycle of the operation.

A conventional detent assembly 82 is secured to the turret and comprises a spring loaded detent 83 engageable with notches 84 in the ratchet wheel 69. The purpose of the detent assembly is to insure accurate positioning of the turret at each station of the indexing device.

Received through circumferentially spaced openings 68 in the turret 66 are a plurality of plungers indicated generally at 87 (see particularly Figures 7 and 9). The plungers 87 comprise a lower section 89 slidably received through the turret and having an enlarged portion 89a adapted to limit upward movement of the plunger. The lower section 89 is provided axially thereof with a threaded opening 89b adapted to receive the threaded stem 88a of an upper section 88. The height of each plunger assembly may be adjusted by varying the amount that the stem 88a is threaded into the opening 89b and the adjusted height is maintained by a stop nut 88b threaded onto the portion 88a and tightened down against the lower sections 89. A spring 90 compressed between the upper surface of the turret 66 and a shoulder 88c of the section 88 urges the assembly 87 into its uppermost position with the enlarged portion 89a abutting the lower face of the turret 66.

An index cam assembly indicated generally at 92 is slidably positioned on the index shaft 60 adjacent the upper side of the turret. The index cam assembly comprises a cylindrical portion 94, presenting a slot 95, adjacent its upper end, and at its lower end an index cam 96 is provided with teeth 98 which are engageable with cam teeth 71 of the turret cam 70. The index cam 96 may be provided with a hub 100 to insure its alignment within the cylinder 92.

A guide bracket 104 (Figure 5) having a guide cam follower 106 is preferably secured to the movable platen 22, with the cam follower 106 engaging the slot 95 of the index cam cylinder.

A spring 102 surrounding the index shaft 60 and compressed between the cylinder portion 94 of the index cam assembly 92 and the upper shaft support point 62 urges the cylindrical portion downwardly and positions said portion with the uppermost end of the slot 95 engaged with the follower 106 and with the teeth 71 and 98 of the cams 70 and 96, respectively, in proper alignment for engagement during the indexing cycle.

Also secured to the platen 22 is a follower assembly 108 (Figures 4 and 5) comprising a follower abutment head or plate 110 which is engageable with the plungers 87, and a follower slide or collar 112 which is slidably positioned on the control shaft 44.

Describing now the conventional latch-type four-way valve 36 shown in detail in Figure 8, it may be seen that the valve comprises a body 122 having an axially extending chamber 124 adapted to receive therethrough a spindle 126. The valve 36 is provided with a port 128 communicating with the advance chamber of the press cylinder 18 and a port 130 communicating with the return chamber of cylinder 18. The valve is also provided with an inlet port 132 through which fluid is received from the pump 30. Also provided are a pair of outlet ports 134 and 136 connected by the lines 32 to the reservoir 34. The valve spindle is constantly biased upwardly (as viewed in Figure 8) by a spring 139 to a position whereby fluid under pressure will flow from inlet port 132 through port 130 to the return chamber of the press cylinder 18 and simultaneously fluid will be free to be exhausted from the advance chamber of cylinder 18 through ports 128 and 134 and thence to the reservoir 34. The spindle may be moved downwardly against the force of the spring 139 and hold in a neutral position at which time no fluid flow will occur through the valve. The spindle may also be moved further downwardly to an advance position at which time fluid under pressure will flow through inlet port 132 and through port 128 to the advance chamber of cylinder 18 and simultaneously fluid will be exhausted from the return chamber through ports 130 and 136 to the reservoir 34.

The spindle 126 is shown in the advance stroke position in Figure 8 and when moved to this position is restrained thereat by a spring biased latch 138 until released by a latch plunger 37 in a manner to be explained hereinafter.

The plunger 37 is secured to the lever 40 by a pivotal connection 41 and is slidably received within the opening 124 of the valve 36. The plunger 34 is provided with an opening 143 adapted to receive the lower portion of the spindle 126 and is also provided with a transverse slot 144 adapted to slidably receive a pin 140 pressed into the spindle 126. The plunger is urged downwardly relative to the spindle by a spring 142 but it will be apparent that the plunger may be urged upwardly by an external force against the resistance of the spring 142 until it strikes the the latch 138 and forces the latch out of engagement with the shoulder 145 of the spindle. When this occurs, the spindle, through the combined forces of springs 139 and 142, will be slammed upwardly to its uppermost or return position.

Before describing the operation of the device, it should be noted that normally the length of the platen stroke is constant and is determined by the length of the cylinder and the distance between the platens. However, in many types of press operations, it is desirable to restrict or limit the length of the stroke of the movable platen to provide a series of strokes of varying lengths in a predetermined pattern or sequence for one particular work piece. The purpose of the indexing device is to automatically regulate the length of stroke of the platen to conform to the predetermined sequence.

At the start of a cycle of operation the valve spindle 126 is in the neutral position and the platen 22 is motionless in its raised position. It may be presumed that the work piece (not shown) is properly positioned on the lower platen 14 and that the plungers 87 have been adjusted to the proper heights to determine thereby the successive strokes of differing length as required to form the work piece.

Figure 4:
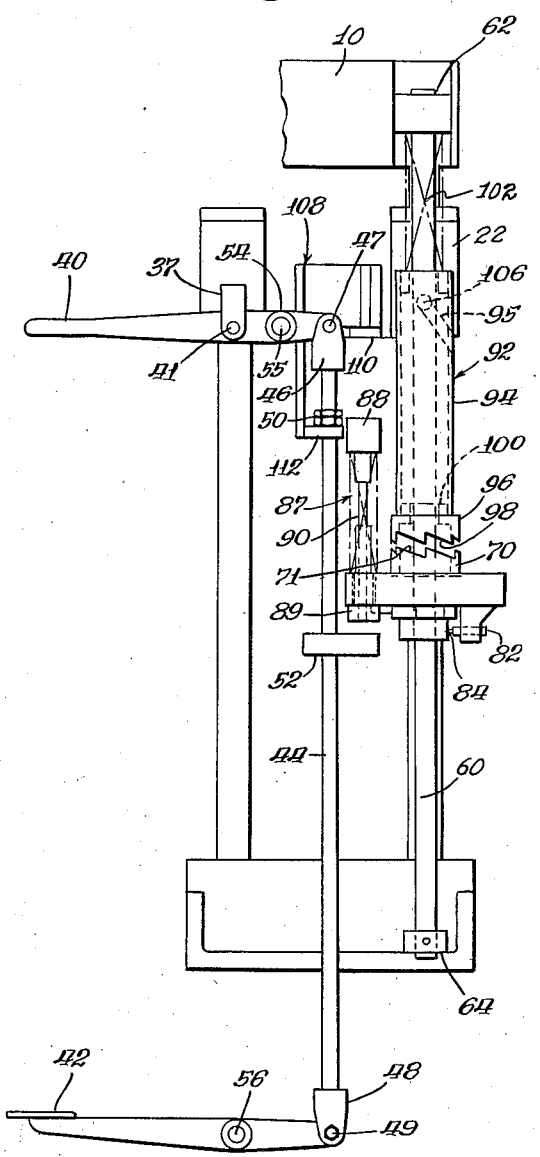
Figure 4 is a fragmentary side elevational view of the indexing device.

To start the operation, the operator depresses either the hand lever 40 or the lower foot lever 42. The lever 40 is thereby pivoted about the pivot 55 in a counterclockwise direction as viewed in Figure 4, and the plunger 37 and spindle 126 are moved downwardly to the advance position shown in Figure 8. As explained heretofore pressure fluid is now directed through the advance chamber of the cylinder 18 and the platen 22 starts its downward stroke. As platen 22 moves downwardly, the bracket 104, being secured thereto, and the cam follower 106 also move downwardly. The cylinder portion 94, due to its own weight and also to the urging of spring 102, moves vertically downward until the index cam 96 engages the turret cam 70 thereby preventing further downward movement of cylinder portion 94. The follower 106, however, is still moving downwardly with the platen 22 and to accommodate this motion, the follower 106 slides in the cam slot 95 causing the index cam assembly 92 to rotate in a counterclockwise direction as seen in Figure 5. The teeth 98 (Figure 4) of index cam 96 now engage teeth 71 of turret cam 70, and the turret 66 is thereby rotated one index station to bring the proper spring plunger 87 directly under the stop or abutment plate 110 of the follower 108. As the platen 22 continues downward, the follower 106 follows the vertically disposed portion 95a (Figure 7) of the slot so that no further rotation of the index cams occurs. Plate 110 now contacts the top of the particular plunger 87 which is positioned thereunder and moves the entire plunger assembly 87 downwardly against the resistance of the spring 90 until the lower section 89 of the plunger 87 contacts the lower stop 52 on control shaft 44. The shaft 44 now moves downwardly and rotates the lever 40 in a clockwise direction as seen in Figure 4 and this action moves the latch plunger 37 upwardly to disengage the latch 138 from the shoulder 145 of spindle 126 as described heretofore. Immediately the spindle 126 is slammed upwardly to the return position and, as described before, fluid flow through the valve will be reversed and the ram 18 and platen 22 will rise on the return stroke. It is thought evident from the above explanation that the particular height of the plunger 87 which is disposed under the abutment plate 110 determines the length of the ram and platen stroke. For example, when the plungers are lengthened, the platen and abutment plate require a shorter stroke to move the plunger into contact with the stop 52 and thereby reverse the position of valve 36. Conversely, when the plunger 87 is shortened, a longer press stroke results.

As the platen 22 rises the collar 112, being secured thereto for movement therewith, also rises and at the proper time contacts the adjustable stop nuts or abutments 50. As the abutments 50 are secured to control shaft 44, the abutments together with the control shaft 44 move upwardly. This action pivots the lever 40 in a counterclockwise direction (as viewed in Figure 4), and the spindle 126 of valve 36 is thereby moved downwardly into the neutral position at which time no fluid can flow through the valve and the ram 18 and platen 22 which is secured thereto will therefore stop. The mechanism is now ready for the next cycle.

It should be noted here that as the platen rises on its return stroke, the cylinder 94, because of its weight and also the force of the spring 102, is rotated in a clockwise direction (as seen in Figure 5) due to the fact that the cam slot 95 slides along the follower 106. This rotation causes disengagement of the index cam teeth 98 from the turret cam teeth 71 and returns the cylinder 94 to the position shown in Figure 4. The ratchet device 72, as explained heretofore, prevents counter-rotation of the turret on the return stroke of the platen and indexing mechanism.

Although the press illustrated is a vertical press the novel indexing device may be readily adapted to a horizontal press or other type of machine wherein it is desired to regulate the length of sequential strokes of a movable member.

I claim:

1. In an indexing arrangement for a press having a frame, a movable member slidably carried by said frame, power means to move said member, and a control device for said power means; the combination of a control lever fulcrumed intermediate its ends to the frame, a control shaft having spaced upper and lower stops thereon, said lever having at one of its ends a pivotal connection to one end of said shaft and having adjacent the other of its ends a pivotal connection to control said device, an index shaft secured to said frame, a rotatable turret positioned on said index shaft, said turret having a plurality of circumferentially spaced openings therein and having ratchet means on one side thereof, said ratchet means comprising ratchet teeth and a spring loaded pawl on said turret, a plurality of spring loaded plungers of varying lengths extending through the respective openings of said turret, cam teeth on said turret, an index cam slidably positioned on said index shaft, said index cam having cam teeth at one end thereof engageable with the cam teeth of the turret and having at the other end thereof a cylinder presenting a slot therein, a guide lug rigidly secured to said member and slidably receivable in said slot, and a follower rigidly secured to said member, said follower comprising a head engageable with one of said plungers, and a follower slide slidably positioned on said control shaft between said abutment stops.

2. In an indexing device for a press having a frame, a movable member carried by the frame, power means to move said member, control means for said power means, an operating lever fulcrumed to said frame, a control shaft having a stop thereon and pivotally connected to said lever, and a connection between said lever and said control means; the combination of an index shaft having its ends secured to said frame, a turret rotatably positioned on said index shaft and having teeth, an index cam slidably positioned on said index shaft and having at one of its ends teeth engageable with the teeth of said turret and having a slot adjacent the other of its ends, a guide affixed to said member and receivable in said slot, a follower fixed to said member, and plungers positioned in and extending through said turret, said plungers each being engageable with said follower and said stop.

3. A press according to claim 2, wherein the respective plungers are spaced circumferentially from each other at equal distances and are of adjustably varying lengths.

4. A press according to claim 2, and including a ratchet device associated with said turret to limit the rotation thereof.

5. In an indexing device for a press having a frame, a movable member carried by the frame, power means to move said member, control means for said power means, an operating lever fulcrumed to said frame, a control shaft having spaced abutment thereon and connected to said lever, and a connection between said lever and said control means; the combination of index shaft means, turret means rotatable on said index shaft means, index cam means slidable and rotatable on said index shaft means and engageable with said turret means, guide means securely fixed to said member and cammed to said indexing cam means to urge said indexing cam means to rotate as said member moves lineally, follower means fixedly secured to said member and slidable on said control shaft intermediate said abutments, and plunger means in said turret means, said plunger means being engageable with said follower means and one of said control shaft abutments.

6. In a press according to claim 5, and including rachet means on said turret means to limit the rotational movement thereof.

7. In an automatic indexing device for a hydraulic press having a frame, a movable platen slidably carried on the frame, power means, a control valve for the power means, a control lever fulcrumed to the frame, an operative connection between the control lever and the power control valve, and a control shaft having spaced stops thereon and having one end connected to said lever; the combination of an index shaft disposed parallel to and adjacent said control shaft and having its ends secured to said frame, an index table rotatable about said index shaft, said table having cam teeth thereon, spring loaded plungers of varying predetermined lengths extending through said table and spaced circumferentially from each other at equal distances, a follower assembly comprising a plate fixedly secured to and movable with said platen, and a follower slide slidably positioned on the control shaft intermediate said stops, the plate being engageable with certain ends of the respective plungers, the opposite ends of the respective plungers being engageable with one of the stops on the control shaft, an index cam having at one end teeth engageable with the teeth of the table and having at the opposite end a cam slot therein, and a guide rigidly secured to and movable lineally with said platen, said guide lug being engageable with said index cam in said slot to urge the index cam to rotate as the platen moves lineally.

8. A hydraulic press according to claim 7, and including a pawl and ratchet teeth associated with said table to limit the rotation thereof.

9. In an indexing mechanism for a machine having a frame, a movable member on said frame, power means to move said member, a power control and control linkage; the combination of shaft means connected to said frame, turret means rotatable about said shaft means, cylinder means rotatable and slidable on said shaft means adjacent and engageable with said turret means, means secured to the member and engageable with the cylinder means to rotate the cylinder means as the member moves lineally, plunger means associated with the turret means and abuttably engageable with the control linkage, and follower means secured to the member and engageable with the plunger means.

10. An indexing mechanism according to claim 9, wherein the plunger means is selectively adjustable.

11. An indexing mechanism according to claim 10, and including ratchet means associated with the turret means to limit the rotational movement thereof.

12. In an arrangement to automatically regulate the length of the stroke of a movable member of a machine on the machine frame; a shaft fixed to the frame, an index cam rotatable about said shaft having a slot adjacent one end thereof and having cam teeth on the other end thereof, a turret rotatable about said shaft having cam teeth engageable with the cam teeth of said index cam, a guide arm on the member having follower means engageable with the slot and operative to rotate the index cam, plunger means extending through said turret, other follower means on the member engageable with the plunger means, and means to restrict the rotation of the turret.

13. In an arrangement according to claim 12, wherein the plunger means comprises plungers of varying lengths spaced from each other circumferentially of the turret.

14. In a press having a frame member carrying a fluid operated motor including a cylinder with advance and return chambers and ram means having advance and return areas in respective chambers; the combination of valve means for alternately delivering pressure fluid to and exhausting pressure fluid from respective chambers, a platen member operated by said ram means, a rotatable element rotatably mounted on one of the members, a plurality of plungers of varying length carried by said rotatable element, a plunger operating element on the other member, valve actuating means actuated by respective plungers to actuate the valve to a position whereat delivery of pressure fluid to said advance chamber is terminated, and cam means on said other member operable to rotate the element to successively index the plungers relative to said valve actuating means on successive advance strokes of said ram means.

15. In a press having a frame member carrying a fluid operated cylinder having ram means dividing said cylinder into advance and return chambers; the combination of valve means for alternately delivering pressure fluid to and exhausting pressure fluid from the respective chambers, a platen member movable with said ram means, a turret rotatably supported by the frame, indexing means operatively engageable with said turret for indexing the turret through a plurality of index positions, a plurality of resiliently mounted plungers of varying length carried by said turret, means operatively connected to and movable with said platen for actuating said indexing means on the advance stroke of said platen, and means actuated by respective plungers to shift the valve means to a position to terminate flow of fluid to said advance chamber and direct flow of fluid to said return chamber.

16. In an indexing device for a machine having a frame, a movable member on the frame and power means to move said member through successive advance and return strokes; the combination of valve means movable to advance and return positions for actuating said power means, a rotatable member, adjustable means carried by said rotatable member, cam means responsive to the advance stroke of said movable member for indexing said rotatable member through successive index positions, said adjustable means being responsive to the advance stroke of said movable member for moving said valve means to the return position thereof.

17. In an indexing device to regulate successive strokes of a movable member, the combination of valve means movable to advance and return positions to actuate said member for advance and return strokes thereof, control means for moving said valve means to advance position, a plurality of resiliently mounted plungers operatively engageable in sequence by said member for shifting said control means to move said valve means to return position, and rotating means for indexing said plungers, said rotating means being responsive to advance stroke movement of said member.

18. A variable stroke press comprising a ram, a hydraulic cylinder having advance and return chambers therein, valve means operable in advance and return positions thereof to deliver fluid alternately to respective chambers, control means for moving said valve means to advance position, a plurality of indexible resiliently mounted plungers of varying length engageable with said control means for moving said valve means to return position thereof, and cam means responsive to advance stroke movement of said ram for indexing said plungers.

19. In an indexing mechanism for a machine having a frame, a movable member on the frame, power means to move said member, and valve means for controlling said power means; the combination of a shaft connected to the frame, turret means indexible about said shaft, means responsive to movement of said member for indexing said turret means, a valve control linkage for shifting said valve means, a plurality of resiliently mounted plungers of varying heights carried by said turret and engageable, upon depression thereof, with said control linkage for actuating the latter, and means movable with said member for depressing said plungers.

20. In a device to automatically regulate the length of the advance stroke of a movable member carried by a machine frame; the combination of a shaft carried by the frame, a turret rotatable about said shaft, an indexing member engageable with the turret to index the latter through a plurality of successive positions, a cam slot in said indexing member, means on the movable member engageable with the slot for actuating said indexing member, plungers received through the turret, follower means on said movable member engageable with said plungers, and means responsive to movement of said plungers to stop the advance stroke of said movable member.

References Cited in the file of this patent

UNITED STATES PATENTS 2,543,759     Cannon et al. _____ Mar. 6, 1951